US012691728B2

(12) United States Patent
Sato et al.

(10) Patent No.: US 12,691,728 B2
(45) Date of Patent: Jul. 28, 2026

(54) DEVICE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tatsumi Sato, Osaka (JP); Kosuke Sone, Osaka (JP); Yasuyuki Yamamoto, Osaka (JP); Takuya Taniguchi, Osaka (JP); Ai Takehisa, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 435 days.

(21) Appl. No.: 18/281,910

(22) PCT Filed: Mar. 11, 2022

(86) PCT No.: PCT/JP2022/010769
§ 371 (c)(1),
(2) Date: Sep. 13, 2023

(87) PCT Pub. No.: WO2022/196544
PCT Pub. Date: Sep. 22, 2022

(65) Prior Publication Data
US 2024/0217310 A1 Jul. 4, 2024

(30) Foreign Application Priority Data
Mar. 15, 2021 (JP) ................................. 2021-041749

(51) Int. Cl.
B60H 1/26 (2006.01)
B60H 1/00 (2006.01)

(52) U.S. Cl.
CPC ......... B60H 1/262 (2013.01); B60H 1/00564 (2013.01)

(58) Field of Classification Search
CPC .... B60H 1/262; B60H 1/245; B60H 1/00564; B60R 11/02; B60R 16/02; H05K 7/20863
See application file for complete search history.

(56) References Cited

U.S. PATENT DOCUMENTS 5,765,635 A * 6/1998 Rhee .................. B60H 1/00742
454/189
12,479,511 B2 * 11/2025 Gey ...................... B62D 25/06
(Continued)

FOREIGN PATENT DOCUMENTS

JP 2003-034120 A 2/2003
JP 2005-199862 A 7/2005
(Continued)

OTHER PUBLICATIONS

International Search Report issued on May 24, 2022 for WO 2022/196544 A1 (4 pages).

*Primary Examiner* — Allen R. B. Schult
(74) *Attorney, Agent, or Firm* — Venjuris, P.C.

(57) ABSTRACT

One aim is to provide a technique allowing a device to be cooled without being housed inside a duct. A device module includes: a support member that is disposed in a roof inner space that is located between a roof panel and an interior member in a vehicle; and a device that is supported by a support surface among outer surfaces of the support member. A support-member-side flow path is formed inside the support member, and the support-member-side flow path is connected to a duct-side flow path in a duct in the vehicle.

15 Claims, 9 Drawing Sheets

(56)  References Cited

U.S. PATENT DOCUMENTS

| | | | |
|---|---|---|---|
| 2005/0231907 A1 | 10/2005 | Glovatsky et al. | |
| 2011/0297659 A1* | 12/2011 | Bixler | ................. B60H 1/2225 |
| | | | 219/201 |
| 2021/0076534 A1 | 3/2021 | Park et al. | |
| 2023/0073687 A1* | 3/2023 | Lindner | ............ B60H 1/00271 |

FOREIGN PATENT DOCUMENTS

| | | | |
|---|---|---|---|
| JP | 2005-239133 A | 9/2005 |
| JP | 2014-033017 A | 2/2014 |

* cited by examiner

DEVICE MODULE

CROSS REFERENCE TO RELATED APPLICATIONS

This application is a national phase of PCT application No. PCT/JP2022/010769, filed on 11 Mar. 2022, which claims priority from Japanese patent application No. 2021-041749, filed on 15 Mar. 2021, all of which are incorporated herein by reference.

TECHNICAL FIELD

The present disclosure relates to a device module.

BACKGROUND

Patent Document 1 discloses a vehicle overhead module in which devices installed to a vehicle are housed inside a roof duct, and the devices are cooled by cooling air flowing inside the roof duct.

PRIOR ART DOCUMENT

Patent Document

Patent Document 1: JP 2005-199862 A

SUMMARY OF THE INVENTION

Problems to be Solved

Because the vehicle overhead module disclosed in Patent Document 1 has a configuration in which devices are housed inside a duct, only a small number of devices can be housed in the duct, and the assembly workability of the overhead module, the maintainability of the devices, etc., may decrease.

In view of this, one aim is to provide a technique allowing a device to be cooled without being housed inside a duct.

Means to Solve the Problem

A device module according to the present disclosure includes: a support member that is disposed in a roof inner space that is located between a roof panel and an interior member in a vehicle; and a device that is supported by a support surface among outer surfaces of the support member, wherein a support-member-side flow path is formed inside the support member, and the support-member-side flow path is connected to a duct-side flow path in a duct in the vehicle.

Effect of the Invention

According to the present disclosure, a device can be cooled without being housed inside a duct.

DETAILED DESCRIPTION TO EXECUTE THE INVENTION

Description of Embodiments of Present Disclosure

Figure 1:
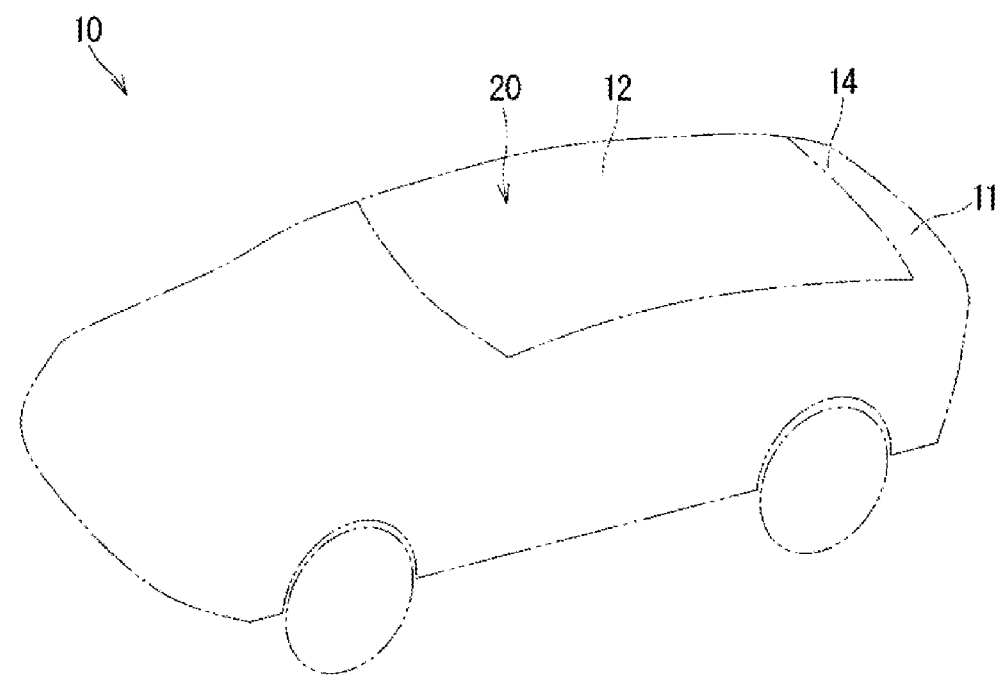
FIG. 1 is a schematic perspective view illustrating a vehicle in which a device module is installed.

First, aspects of embodiment of the present disclosure will be listed and described.

The device module according to the present disclosure is as described below.

(1) A device module including: a support member that is disposed in a roof inner space that is located between a roof panel and an interior member in a vehicle; and a device that is supported by a support surface among outer surfaces of the support member, wherein a support-member-side flow path is formed inside the support member, and the support-member-side flow path is connected to a duct-side flow path in a duct in the vehicle. The device supported by the support surface among the outer surfaces of the support member is cooled as a result of cooling air flowing from the duct-side flow path to the support-member-side flow path. Accordingly, the device can be cooled without being housed inside the duct.

(2) The device module according to (1), wherein the support member may have formed therein a through-hole that is open in a portion of the support surface facing the device and that reaches the support-member-side flow path. Accordingly, the device can be exposed to the support-member-side flow path through the through-hole.

(3) The device module according to (2), wherein the device may be provided with a heat-dissipating portion that faces the through-hole. Accordingly, heat dissipation from the device increases as a result of the heat-dissipating portion being cooled by cooling air.

(4) The device module according to (3), wherein the heat-dissipating portion may project to the support-member-side flow path. Accordingly, the area of the heat-dissipating portion that is directly cooled by cooling air increases.

(5) The device module according to any one of (2) to (4), wherein a housing of the device may have a housing-side air inlet port formed therein, the housing-side air inlet port being formed in a surface of the housing that faces the through-hole, and cooling air flowing in the support-member-side flow path may be discharged to the roof inner space via the through-hole, the housing-side air inlet port, and the interior of the housing. Accordingly, the interior of the housing can be directly cooled by cooling air.

(6) The device module according to any one of (2) to (4), wherein a gap may be provided between the device and a portion of the support surface around the through-hole, and cooling air flowing in the support-member-side flow path may be discharged to the roof inner space via the through-hole and the gap. Accordingly, the device can be directly cooled by cooling air.

(7) The device module according to (5) or (6), wherein the support-member-side flow path may be closed except for the through-hole and an air inlet port that is connected to the duct. Accordingly, cooling air flowing in the support-member-side flow path is basically discharged to the roof inner space from the through-hole.

(8) The device module according to any one of (2) to (6), wherein the support-member-side flow path may have formed therein an air discharge port that is open separately from the through-hole and an air inlet port connected to the duct, and that discharges cooling air to the roof inner space. Accordingly, cooling air flowing in the support-member-side flow path can be discharged to the roof inner space from an air discharge port that is different from the through-hole. Thus, cooling air does not readily stay inside the support-member-side flow path even in a case in which cooling air cannot be readily discharged from the through-hole.

(9) The device module according to any one of (1) to (8), wherein there is a plurality of the devices including a first device and a second device, and a partition that partitions the support-member-side flow path into a first flow path for the first device and a second flow path for the second device may be provided inside the support member. Accordingly, cooling air can flow through different flow paths to the first device and the second device, and a situation can be prevented in which the amount of cooling air flowing to one device is excessively smaller than the amount of cooling air flowing to the other device, or cooling air heated due to heat exchange with one device flows to the other device.

(10) The device module according to any one of (1) to (9) may further include a tubular member that is disposed between the support member and the duct. Accordingly, the support member and the duct can be connected via the tubular member.

(11) The device module according to (10), wherein the tubular member may be formed from a material with high elasticity and include a main body portion and a flange portion that projects from the outer surface of the main body portion, and, in a state in which the main body portion is inserted into the support-member-side flow path from an opening of the support-member-side flow path in the support member, the flange portion may catch on the inner surface of a rim portion of the opening. As a result of the tubular member being formed from a material having high elasticity, the tubular member can be inserted into the support-member-side flow path with ease. Furthermore, the tubular member and the support member cannot be readily pulled out from one another because the flange portion catches on the inner surface of the rim portion of the opening in a state in which the main body portion is inserted into the support-member-side flow path from the opening of the support-member-side flow path in the support member.

(12) The device module according to (10) or (11), wherein the duct may be a rear-seat duct that is provided with an air outlet port directed toward a rear seat and that is disposed in the roof inner space, and the tubular member may connect the support member and the rear-seat duct. Accordingly, the support member and the rear-seat duct can be connected via the tubular member.

(13) The device module according to (10) or (11), wherein the duct may be a front-seat duct that is provided with an air outlet port directed toward a front seat, and the tubular member may connect the support member and the front-seat duct. Accordingly, the support member and the front-seat duct can be connected via the tubular member.

(14) The device module according to any one of (1) to (13) may further include a functional sheet which includes a layer at least having a heat-insulating function and on which the support member is disposed, and an outer surface of the support member that is different from the support surface may be in contact with the functional sheet. Accordingly, heat is not readily transferred from the functional sheet to the support member.

(15) The device module according to (14) may further include a transmission member that is connected to the device, and the transmission member may be provided to the functional sheet. Accordingly, the transmission member can be integrated with the device module.

DETAILS OF EMBODIMENTS OF PRESENT DISCLOSURE

Specific examples of the device module according to the present disclosure will be described in the following with reference to the drawings. Note that the present disclosure is not limited to these examples, and is intended to include all modifications that are indicated by the claims and are within the meaning and scope of equivalents of the claims.

Embodiment 1

In the following, a device module according to embodiment 1 will be described.

<Vehicle in which Device Module is Installed>

FIG. 1 is a schematic perspective view illustrating a vehicle 10 in which a device module 20 is installed. The vehicle 10 includes a body 11. The body 11 is the portion that forms the outer shape of the vehicle 10. The body 11 may be a monocoque body or a body mounted on a ladder frame. Here, the body 11 includes a roof panel 12 and side panels that surround the vehicle cabin, and further includes occupant-door panels that allow occupants to get on and off, a rear-door panel for loading and unloading luggage, etc. The body 11 may be formed from metal or resin. The body 11 may be formed from a combination of metal and resin. The plate-shaped portion of the body 11 covering the vehicle cabin from above is the roof panel 12. In other words, the roof panel 12 forms a roof portion 14 of the vehicle 10. The roof panel 12 may be partially or entirely curved so as to form the exterior shape of the body 11. The roof panel 12 may be formed from metal or resin. The roof panel 12 may be formed from a combination of metal and resin. An antenna hole may be formed in the roof panel 12.

<Installation Position of Device Module in Vehicle>

Figure 2:
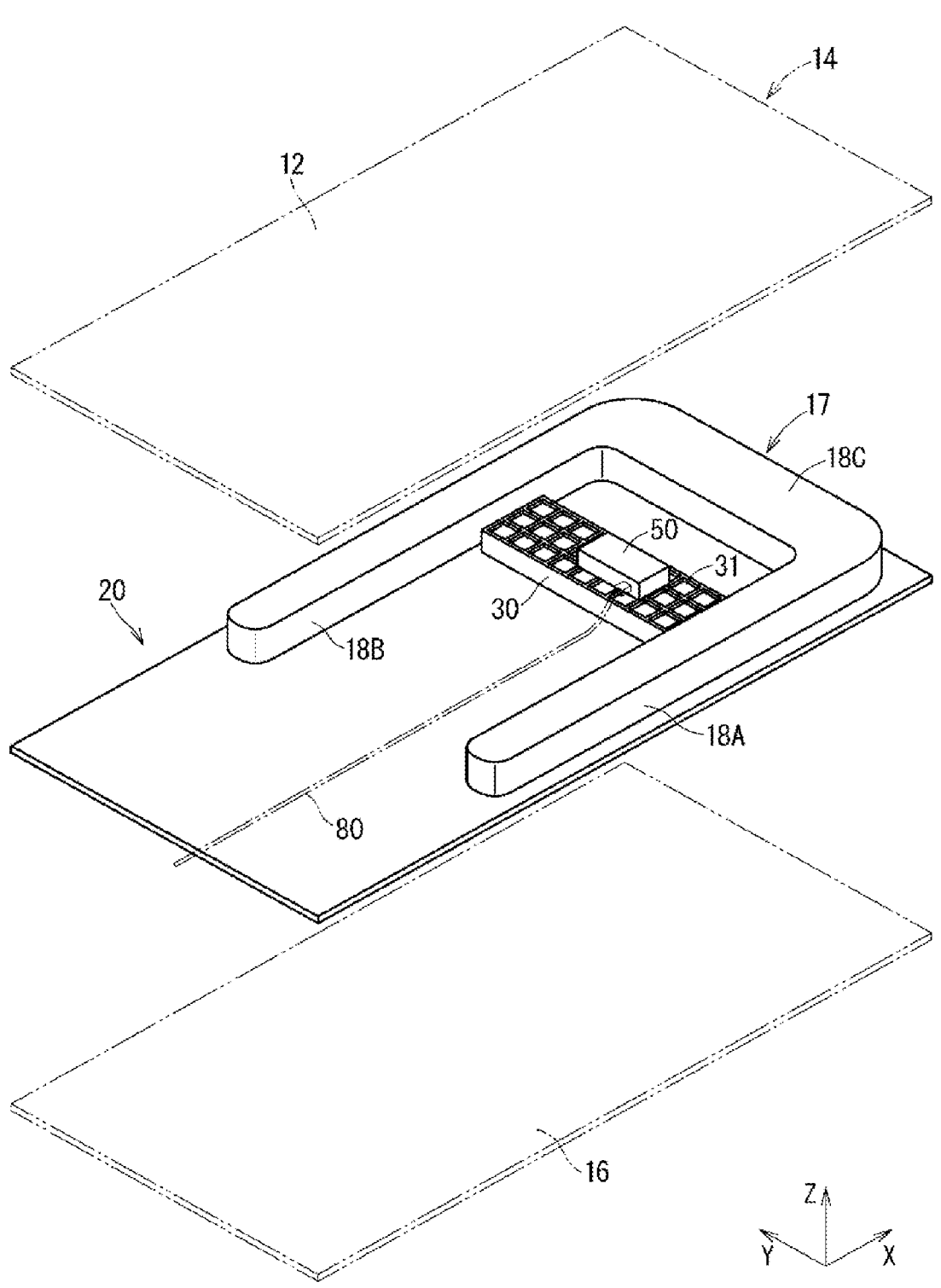
FIG. 2 is a perspective view illustrating a device module according to embodiment 1.

The position where the device module 20 is installed will be described with reference to FIG. 2. FIG. 2 is a perspective view illustrating the device module 20 according to embodiment 1. Mutually orthogonal X, Y, and Z directions are shown in FIG. 2. In the present disclosure, with the device module 20 disposed in the vehicle 10, the X direction is the front-rear direction of the vehicle 10, the Y direction is the width direction of the vehicle 10, and the Z direction is the vertical direction.

The device module 20 is installed in the roof portion 14, which includes the roof panel 12. As the roof portion 14, the roof panel 12 and an interior member 16 are illustrated. The roof portion 14 may include a frame 13 (see FIG. 4) that supports the roof panel 12. The interior member 16 is a plate-shaped member formed from resin or the like. The interior member 16 is a portion that forms the shape of the ceiling inside the vehicle cabin. The interior member 16 may be partially or entirely curved. The interior member 16 is attached to the lower side of the roof panel 12. The interior member 16 is exposed inside the vehicle cabin. The interior member 16 may be called a roof liner. The device module 20 is disposed in a roof inner space. The roof inner space is the space between the roof panel 12 and the interior member 16 in the vehicle 10. The roof inner space is an in-vehicle space that is not occupied by occupants. Note that the in-vehicle space is the space surrounded by the body 11, which forms the exterior of the vehicle 10, and the space occupied by occupants is the space surrounded by the interior member 16, which forms the interior of the vehicle 10.

In the present example, a duct 17 is disposed in the roof inner space. The duct 17 in the present example is a rear-seat duct 17. The duct 17 includes duct-side flow paths 18A, 18B, and 18C. The duct-side flow paths 18A and 18B extend in the X direction in the left and right sides of the vehicle 10. The duct-side flow path 18C extends in the Y direction in the rear part of the vehicle 10, and connects the duct-side flow paths 18A and 18B. The duct 17 is provided with air outlet ports 19A directed toward the rear seats (see FIG. 3). Air outlet ports 19A and 19B are provided in the duct-side flow paths 18A and 18B, for example. Note that, in the vehicle 10, the main body of air-conditioning equipment, such as an air conditioner unit, is usually not disposed in the roof inner space and disposed below the roof inner space (for example, inside the instrument panel, behind the rear seats, or the like). For example, the rear-seat duct 17 is connected to the main body of the air-conditioning equipment, which is disposed behind the rear seats, via a duct passing through a C-pillar, or the like. Cool air from the main body of the air-conditioning equipment is discharged toward the rear seats via the air outlet ports 19A and 19B.

<Device Module>

Figure 3:
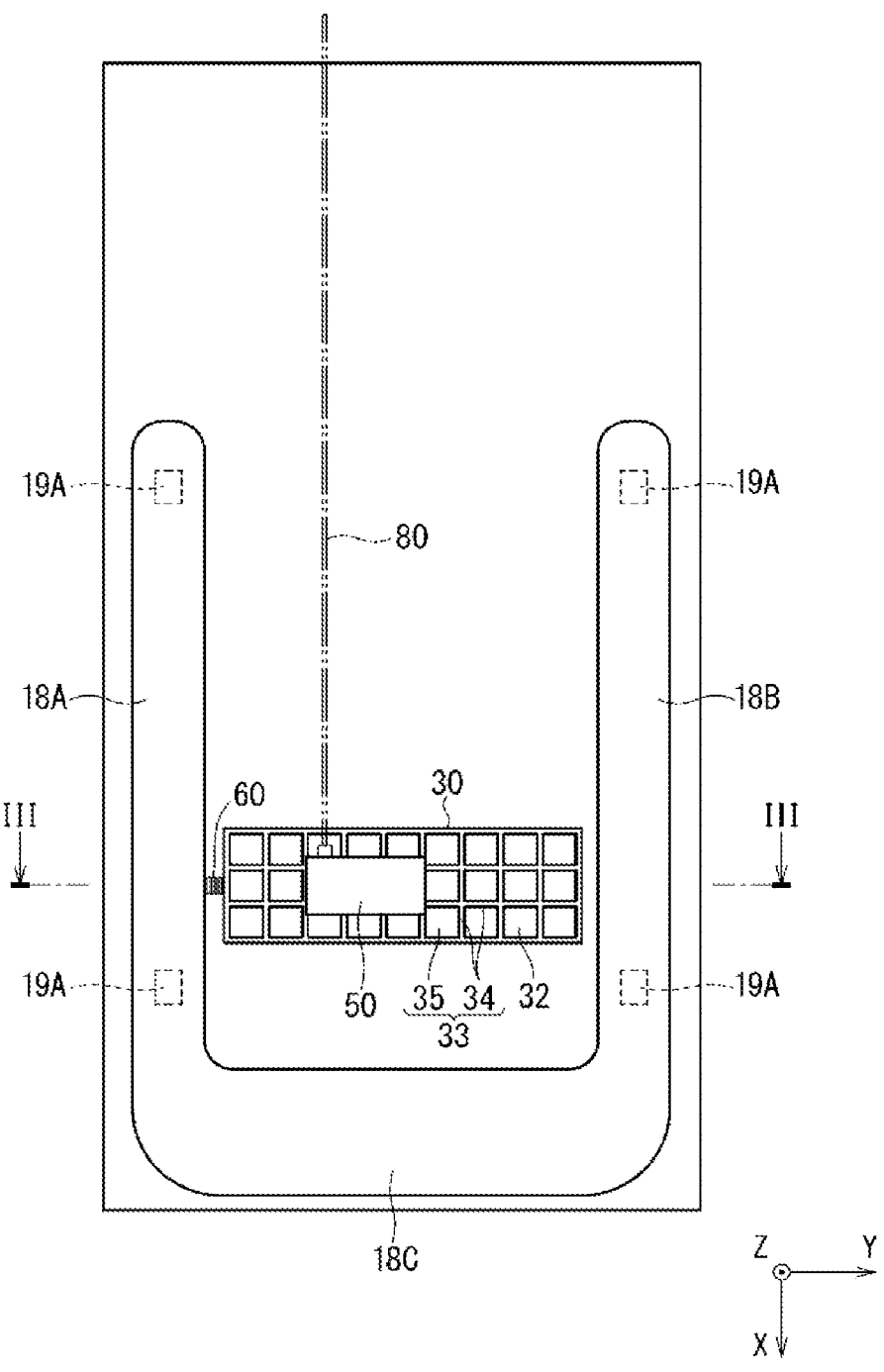
FIG. 3 is a plan view illustrating the device module according to embodiment 1.
Figure 4:
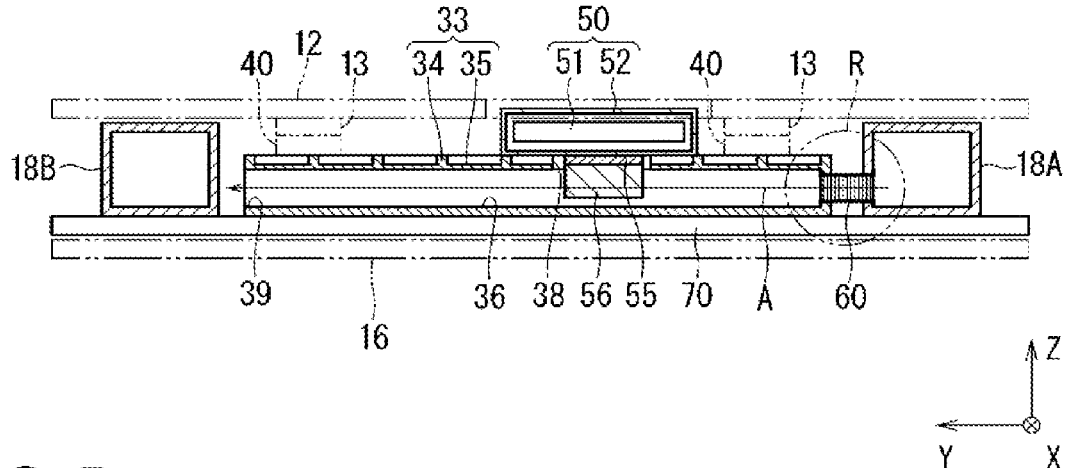
FIG. 4 is a cross-sectional view along line III-III in FIG. 3.
Figure 5:
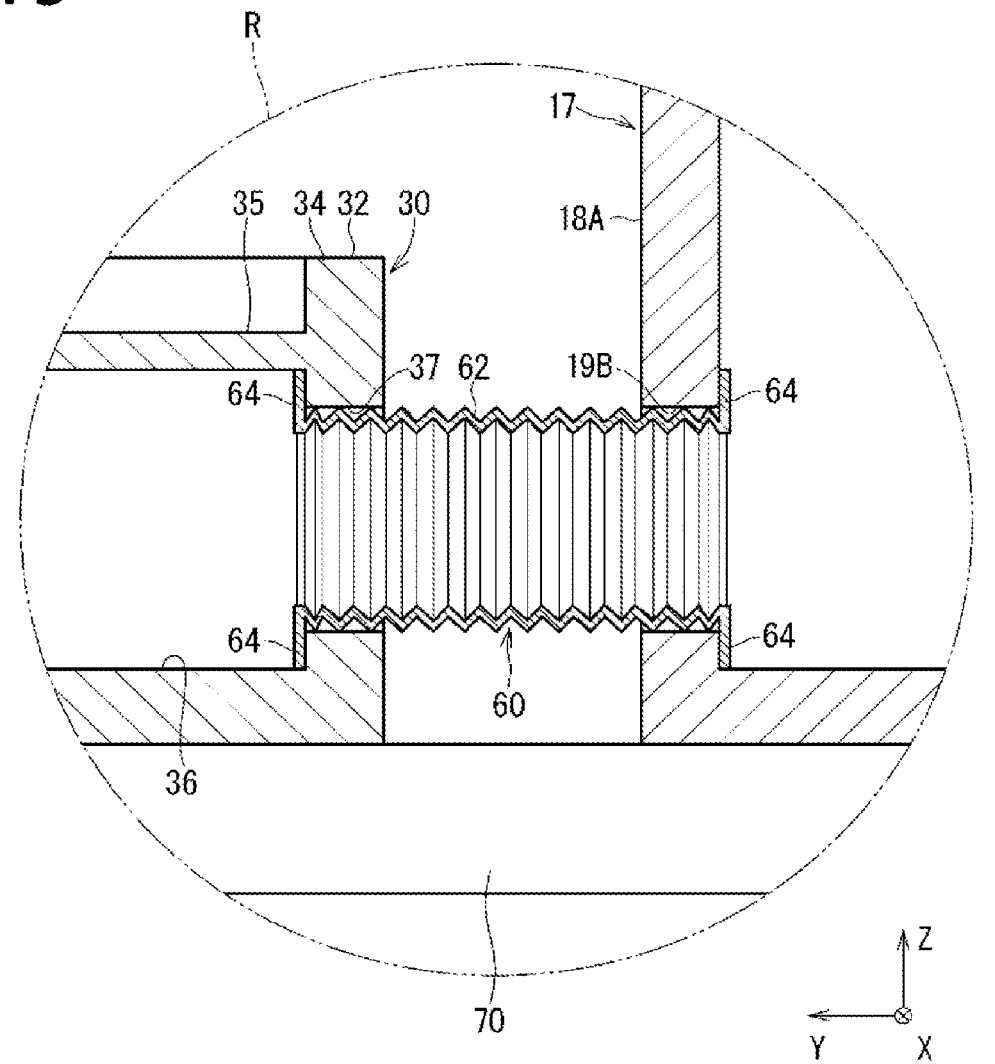
FIG. 5 is an enlarged view of a region R in FIG. 4.
Figure 6:
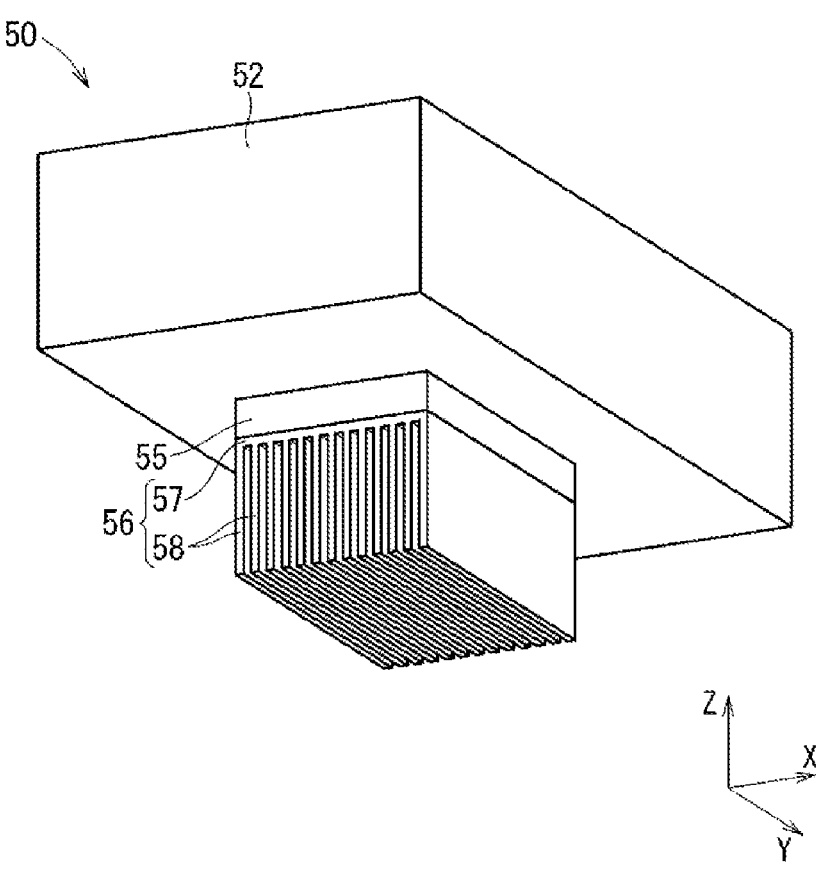
FIG. 6 is a perspective view illustrating a device.
Figure 7:
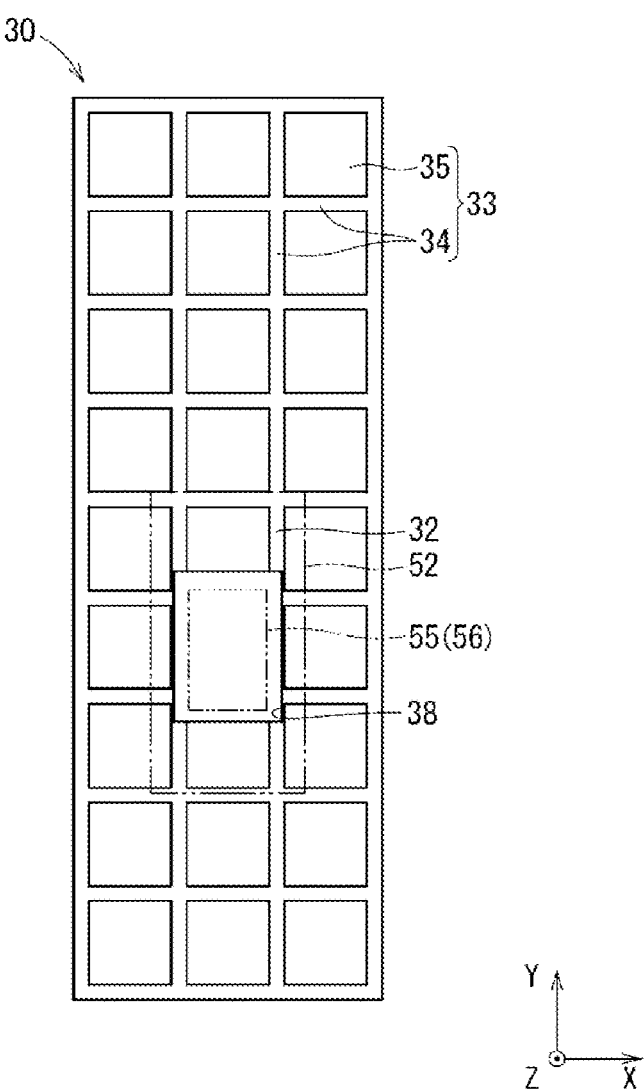
FIG. 7 is a plan view illustrating the device and a support member.

The device module 20 will be described, with reference to FIGS. 3 to 7 in addition to FIG. 2. FIG. 3 is a plan view illustrating the device module 20 according to embodiment 1. FIG. 4 is a cross-sectional view of the device module 20, and is a cross-sectional view along line III-III in FIG. 3. FIG. 5 is an enlarged view of region R in FIG. 4. FIG. 6 is a perspective view illustrating a device 50. FIG. 7 is a plan view illustrating the device 50 and a support member 30.

The device module 20 includes a support member 30 and a device 50. The device module 20 further includes a tubular member 60, a functional sheet 70, and a transmission member 80.

The support member 30 supports the device 50. The support member 30 includes a support main body portion 31. The support main body portion 31 is hollow. The device 50 is supported by a support surface 32 among outer surfaces of the support main body portion 31. In the present example, the support surface 32 is the vertically upward surface. The support surface 32 may be a surface other than the vertically upward surface. The support surface 32 is provided with a recess-and-projection portion 33. Ribs 34 forming the shape of a grid are provided on the support surface 32. The portions of the ribs 34 are projections 34 in the recess-and-projection portion 33, and portions surrounded by the ribs 34 are recesses 35 in the recess-and-projection portion 33. The device 50 is supported on top of projections 34, and is not in contact with the recesses 35.

A support-member-side flow path 36 is formed inside the hollow support main body portion 31. The support-member-side flow path 36 is formed by the space inside the support main body portion 31 and inner surfaces of the support main body portion 31 surrounding the space. The support main body portion 31 is longer in the Y direction than in the X and Z directions. The support-member-side flow path 36 extends in the longitudinal direction (the Y direction in this case) of the support member 30.

The support-member-side flow path 36 is connected to a duct-side flow path in the duct 17 in the vehicle 10. Here, the support-member-side flow path 36 is connected to only the duct-side flow path 18A, which is one of the duct-side flow paths 18A and 18B in the left and right sides of the vehicle 10. The support-member-side flow path 36 is open in three directions. The three openings are an air inlet port 37, a through-hole 38, and an air discharge port 39.

The air inlet port 37 is open in a surface facing the Y direction (surface facing the duct-side flow path 18A) among the outer surfaces of the support main body portion 31. The air inlet port 37 is connected to the duct-side flow path 18A. Accordingly, cooling air can flow into the support-member-side flow path 36 from the duct-side flow path 18A via the air inlet port 37. Here, the support-member-side flow path 36 and the duct-side flow path 18A are connected via the tubular member 60. An air outlet port 19B directed toward the support member 30 is provided in the duct-side flow path 18A separately from the air outlet ports 19A directed toward the rear seats. The air outlet port 19B is open in a surface facing the support member 30. The air inlet port 37 and the air outlet port 19B are provided at corresponding positions in XZ planes. The air inlet port 37 and the air outlet port 19B are connected via the tubular member 60. The air inlet port 37 is an opening smaller than the support-member-side flow path 36. Accordingly, the rim portion of the air inlet port 37 is a flat-plate portion that extends along an XZ plane.

The through-hole 38 is open in the support surface 32. The through-hole 38 is open in a portion of the support surface 32 facing the device 50. In the example illustrated in FIG. 7, the through-hole 38 has a rectangular shape that is longer in the Y direction than in the X direction when seen from the Z direction. The through-hole 38 is larger than a single recess 35 in both the X and Y directions. The through-hole 38 is smaller than the device 50 in both the X and Y directions. However, the shape and size of the through-hole 38 is not particularly limited and could be set as appropriate.

The air discharge port 39 is an opening that is different from the air inlet port 37 and the through-hole 38. The device 50 is provided between the air inlet port 37 and the air discharge port 39 along the direction in which the support-member-side flow path 36 extends. The air discharge port 39 is open in a surface facing the Y direction, among the outer surfaces of the support main body portion 31, that is a surface (surface facing the duct-side flow path 18B) facing the opposite side from the surface in which the air inlet port 37 is open. The air discharge port 39 is an opening having the same size as the support-member-side flow path 36.

The device 50 is supported by the support surface 32 of the support member 30. For example, the device 50 is an electronic device including an electric circuit. For example, the device 50 is a communication device for communication with the outside. In the present example, the device 50 is disposed closer to the roof panel 12 along the Z direction than the support member 30 is. Furthermore, the device 50 is disposed closer to the roof panel 12 along the Z direction than the functional sheet 70 is. The device 50 includes a device main body 51 and a housing 52. The device main body 51 includes a circuit board, electronic components, and the like. The device main body 51 is housed inside the housing 52. The outer surface of the housing 52 is in contact with the support surface 32. The housing 52 may be formed from resin. The housing 52 may be formed from metal. The housing 52 may be a composite member including resin and metal portions.

The device 50 is provided with a heat-dissipating portion. The heat-dissipating portion faces the through-hole 38. Accordingly, the heat-dissipating portion can come into direct contact with cooling air. Here, the heat-dissipating portion projects further toward the through-hole 38 side than the portion of the housing 52 that is in contact with the support surface 32 does. However, the outer surface of the heat-dissipating portion may be flush with the portion of the housing 52 that is in contact with the support surface 32. Here, the heat-dissipating portion projects to the support-member-side flow path 36. However, the heat-dissipating portion need not project to the support-member-side flow path 36, projecting no further than the through-hole 38. Here, a heat-transfer member 55 and a heat sink 56 are provided as heat-dissipating portions.

The heat-transfer member 55 is attached to the lower surface of the housing 52. The heat-transfer member 55 is not particularly limited; however, for example, a member that can adhere as closely as possible (without any gap) to the housing 52 is preferable. For example, the heat-transfer member 55 may be heat-dissipating grease, a heat-dissipating sheet, heat-dissipating rubber, or the like.

The heat sink 56 is attached to the lower surface of the heat-transfer member 55. The heat sink 56 includes a base 57 and a plurality of fins 58. The base 57 and the plurality of fins 58 are formed in the shape of flat plates. The base 57 extends in parallel with an XY plane. The base 57 connects the plurality of fins 58 at the device 50—side along the Z direction. The plurality of fins 58 are positioned inside the support-member-side flow path 36. The plurality of fins 58 project in the Z direction in parallel with one another from one surface of the base 57. The fins 58 each extend in parallel with an YZ plane. The plurality of fins 58 are separated from one another along the X direction. Accordingly, the amount of heat exchanged between the heat sink 56 and cooling air increases because cooling air can pass through the space between fins 58 facing one another.

The housing 52, the heat-transfer member 55, and the heat sink 56 may be fixed to one another in any way. For example, the housing 52, the heat-transfer member 55, and the heat sink 56 may be fixed to one another by means of an adhesive applied to both sides of the heat-transfer member 55. Alternatively, for example, the housing 52 and the heat sink 56 may be fixed to one another mechanically by screwing or pinning, and the heat-transfer member 55 may be sandwiched between the housing 52 and the heat sink 56.

The dimensions of the heat-transfer member 55 and the heat sink 56 are not particularly limited; however, it is preferable that the dimensions be set in accordance with the through-hole 38. In a case in which the heat-transfer member 55 has lower thermal conductivity than the heat sink 56, it is preferable that the thickness (Z-direction length) of the heat-transfer member 55 be smaller than the Z-direction length of the heat sink 56.

In FIG. 4, the flow of cooling air in the support-member-side flow path 36 is indicated by arrow A. Cooling air entering the support-member-side flow path 36 from the air inlet port 37 passes through the portion where the device 50 is provided along the way to the air discharge port 39. Upon passing the portion, the cooling air is heated by receiving heat from the device 50. The device 50 is cooled by transferring heat to the cooling air. The heated cooling air is discharged to the roof inner space from the air discharge port 39. Accordingly, a decrease in the efficiency of the heat exchange between cooling air and the device 50, which would otherwise be caused by heated cooling air staying inside the support-member-side flow path 36, can be prevented. That is, when the main body of the air-conditioning equipment operates and cooling air is sent to the support-member-side flow path 36, the device 50 can always exchange heat with fresh cooling air.

In particular, here, the heat sink 56, which is a heat-dissipating portion, is disposed inside the support-member-side flow path 36. Accordingly, more heat can be transferred from the device 50 side to cooling air flowing in the support-member-side flow path 36 because the cooling air can exchange heat with the heat sink 56.

Here, the outer surface of the housing 52 is in contact with projections 34 on the support surface 32. In a state in which the housing 52 of the device 50 is in contact with projections 34, portions where the housing 52 of the device 50 and projections 34 are in contact surround the through-hole 38 from four directions when seen from the Z direction. Accordingly, the opening portion of the through-hole 38 is closed by the housing 52 and projections 34, and the support-member-side flow path 36 thus is not connected to the roof inner space via the through-hole 38. Thus, the through-hole 38 does not function as an air discharge port 39. However, the support-member-side flow path 36 may be connected to the roof inner space via the through-hole 38. The through-hole 38 may function as an air discharge port 39.

The tubular member 60 is disposed between the support member 30 and the duct 17. The tubular member 60 connects the support member 30 and the rear-seat duct 17. The tubular member 60 is positioned in one end portion of the support member 30 to connect the support member 30 and the duct 17. Here, one end portion of the tubular member 60 is connected to the air inlet port 37, and the other end portion of the tubular member 60 is connected to the air outlet port 19B. The tubular member 60 includes a tubular main body portion 62 and flange portions 64.

The tubular main body portion 62 is a hollow tube. In the present example, the tubular main body portion 62 is formed in the shape of a corrugated tube in which annular projections and annular recesses are continuously disposed in an alternating fashion. Accordingly, even if the air inlet port 37 and the air outlet port 19B assume different positions in an XZ plane, the difference in position can be readily absorbed by the tubular main body portion 62. However, the tubular main body portion 62 need not have the shape of a corrugated tube, and for example, may have the shape of a straight tube in which the same transverse cross-section continues.

The flange portions 64 project from the outer surface of the tubular main body portion 62. The flange portions 64 are provided on the one and the other end portions of the tubular main body portion 62. The flange portions 64 are formed so as to be larger than the air inlet port 37 and the air outlet port 19B. The tubular member 60 is formed from a material having high elasticity. The tubular member 60 is elastically deformable such that the flange portions 64 can become smaller than and pass through the air inlet port 37 and the air outlet port 19B. In a state in which the one end portion of the tubular main body portion 62 is inserted into the support-member-side flow path 36 from the air inlet port 37 in the support member 30, a flange portion 64 catches on the inner surface of the rim portion of the air inlet port 37. In a state in which the other end portion of the tubular main body portion 62 is inserted into the duct-side flow path 18A from the air outlet port 19B in the duct 17, a flange portion 64 catches on the inner surface of the rim portion of the air outlet port 19B.

Note that the configuration in which the tubular member 60 and the support-member-side flow path 36 are connected such that the tubular member 60 enters the interior of the support-member-side flow path 36 from the air inlet port 37 is not essential. For example, the air inlet port 37 may include a cylinder portion that projects outward, and the tubular member 60 may be connected so as to cover the cylinder portion from the outside. The same could be said regarding the connection between the duct-side flow path 18A and the tubular member 60.

The functional sheet 70 is a member that is provided separately from the interior member 16. The support member 30 is disposed on the functional sheet 70. An outer surface of the support member 30 that is different from the support surface 32 is in contact with the functional sheet 70. The support member 30 and the transmission member 80 are fixed to the functional sheet 70. The functional sheet 70 is a sheet to which such members are fixed, and which also includes a layer having at least one of a heat-insulating function, a sound-insulating function, and a radio-wave-shielding function. In the present example, the functional sheet 70 at least includes a layer having the heat-insulating function.

For example, a non-woven layer can be used as the layer having the heat-insulating function. A non-woven layer is one example of a layer having a heat-insulating property for ensuring that heat is not readily transferred between one main surface side and the other main surface side of the functional sheet 70. The heat-insulating layer may be a layer that reflects heat-radiation energy. The heat-insulating layer may be a layer having lower thermal conductivity than other layers. Other than a non-woven sheet, a sheet including fine voids, such as a foamed sheet, may be used as the heat-insulating layer, for example. A heat-insulating coating or heat-shielding coating may be used as the heat-insulating layer.

A non-woven layer can also be considered one example of a layer having a sound-insulating property for ensuring that sound is not readily transferred between the one main surface side and the other main surface side of the functional sheet 70. The layer having the sound-insulating property may reflect sound or absorb sound energy as heat energy. Other than a non-woven sheet, a sheet including fine voids, such as a foamed sheet, may be used as the sound-insulating layer, for example. A sound-absorbing coating may be used as the sound-insulating layer. The heat-insulating layer and the sound-insulating layer may be provided as physically separate layers.

The functional sheet 70 may have a single-layer structure. The functional sheet 70 may have a multi-layer structure. For example, an above-described non-woven layer and a radio-wave-shielding layer may be laminated in the functional sheet 70.

The radio-wave-shielding layer is a layer for ensuring that radio waves are not readily transferred between the one main surface side and the other main surface side of the functional sheet 70. The radio-wave-shielding layer may have a property of shielding radio waves of all frequencies. The radio-wave-shielding layer may have a property of selectively shielding radio waves of some frequency bands. In this case, it is sufficient that radio waves of some frequency bands are reflected and/or absorbed by the radio-wave-shielding layer. The radio-wave-shielding layer may be a layer formed from a metal foil of aluminum, iron, or the like. A known frequency-selective surface (FSS) may be used as the radio-wave-shielding layer having a property of selectively shielding radio waves. An FSS is obtained by forming unit cells (elements) using a metal foil or the like on a base film formed from resin or the like. Such an FSS has a characteristic of selectively shielding radio waves of one or more frequency bands in accordance with frequency characteristics of the unit cells (elements), and allowing radio waves of other frequency bands to pass. The radio-wave-shielding layer having a property of selectively shielding radio waves may be formed by directly printing electroconductive paste or the like onto the heat-insulating layer or the sound-insulating layer.

In a case in which the functional sheet 70 has a multi-layer structure, the functional layers may be overlaid on one another in any order. For example, in the functional sheet 70, the radio-wave-shielding layer may be provided on the upper side or the lower side of the non-woven layer. Furthermore, the functional layers may each have any size. The functional layers may be formed in the same size. Another functional layer may be provided on part of one functional layer. Note that the functional layers may simply be overlaid on one another. The functional layers may be fixed to one another by means of a double-sided tape, an adhesive, welding, or the like.

Furthermore, in a case in which the functional sheet 70 includes a plurality of functional layers, the plurality of functional layers need not be disposed so as to be overlaid on one another in the thickness direction of the functional sheet 70. The plurality of functional layers may be provided in different regions within an area in which the functional sheet 70 extends. For example, the plurality of functional layers may be provided side by side within the area in which the functional sheet 70 extends.

The transmission member 80 is connected to the device 50. The transmission member 80 is a member that transmits electricity, light, or the like, and is a member that is provided in the functional sheet 70 along a wiring path at least one end of which is connected to the device 50. For example, the transmission member 80 may be a general electric wire having a core wire and a covering around the core wire, or may also be a bare conductive wire, a shielded wire, an electrical cable, an enamel wire, a nichrome wire, a coaxial wire, an optical fiber, or the like. That is, the transmission member 80 may be a linear member that transmits electricity. The linear member that transmits electricity may be various types of signal lines or power lines. Furthermore, the linear transmission member 80 that transmits electricity may be a single linear object, or a composite of a plurality of linear objects (a twisted wire, a cable in which a plurality of linear objects are bundled and covered with a sheath, or the like). The transmission member 80 may be formed by applying an electroconductive coating to the functional sheet 70, by etching a copper foil, or the like. Here, description will be provided assuming that the transmission member 80 is an electric wire.

The device 50 transmits or receives an electric signal or an optical signal via the transmission member 80. Alternatively, the device 50 receives power supply via the transmission member 80 or distributes power via the transmission member 80. The connection between the transmission member 80 and the device 50 may be established via a connector. The transmission member 80 may be directly introduced into the device 50 and directly connected to an electrical element inside the device 50. Note that the transmission member 80 illustrated in FIGS. 2 and 3 indicates a schematic path, and, despite being illustrated as a single line, the transmission member 80 may include a plurality of electric wires or the like.

The transmission member 80 is provided to the functional sheet 70. This means that a medium that transmits electricity or light is formed so as to form a path of electricity or light in the functional sheet 70. Accordingly, other than a transmission member 80 that is directly formed on the functional sheet 70 by applying an electroconductive coating, by etching a copper foil, or the like, the transmission member 80 provided to the functional sheet 70 may also be a transmission member 80 obtained by attaching a linear transmission member 80 manufactured separately from the functional sheet 70 so as to form a certain path along one or both main surfaces of the functional sheet 70, and the like. The specific configuration for supporting the transmission member 80 is not particularly limited.

For example, the transmission member 80 may be fixed to one main surface of the functional sheet 70. For example, the transmission member 80 may be welded (or fused) to one main surface of the functional sheet 70. The welded portion thereby formed is in a state in which the transmission member 80 and the functional sheet 70 are bonded as a result of part of at least one of the transmission member 80 and the functional sheet 70 melting. The transmission member 80 and the functional sheet 70 may be welded by means of ultrasonic welding or heat welding. Alternatively, the transmission member 80 and the functional sheet 70 may be welded by the surface of at least one of the transmission member 80 and the functional sheet 70 being melted using a solvent. Alternatively, for example, the transmission member 80 may be fixed to the functional sheet 70 using an adhesive, a double-sided tape, or the like. Alternatively, for example, the transmission member 80 may be sewn to the functional sheet 70 using a sewing thread or the like. Alternatively, for example, the transmission member 80 may be fixed to one main surface of the functional sheet 70 by an adhesive tape being affixed so as to extend over the transmission member 80 from the outer side of the one main surface of the functional sheet 70 in a state in which the transmission member 80 is disposed on the one main surface of the functional sheet 70. The transmission member 80 need not be fixed to only one main surface of the functional sheet 70. The transmission member 80 may include both a portion that is fixed to one main surface of the functional sheet 70 and a portion that is fixed to the other main surface of the functional sheet 70. In this case, the transmission member 80 may be fixed along the functional sheet 70 so as to pass through the functional sheet 70 from one main surface to the other surface at a middle portion or an end edge portion of the functional sheet 70.

Alternatively, for example, the transmission member 80 may be fixed to the functional sheet 70 by being sandwiched between two sheets. For example, in a case in which the functional sheet 70 includes multiple layers, the transmission member 80 may be sandwiched between sheets constituting the layers. Alternatively, in a case in which another sheet is overlaid on the functional sheet 70, the transmission member 80 may be sandwiched between the functional sheet 70 and the other sheet. In this case, the two sheets sandwiching the transmission member 80 may be fixed to one another by welding or may be fixed to one another using an adhesive or a double-side tape.

Here, the transmission member 80 is provided on the roof panel 12—side surface of the functional sheet 70. The transmission member 80 may be provided on the interior member 16—side surface of the functional sheet 70.

The support member 30 is provided on the functional sheet 70. In addition to the function of supporting the device 50 and the function of allowing cooling air to flow, the support member 30 may have the function of providing the functional sheet 70 with a characteristic such that the functional sheet 70 does not readily deform. The support member 30 may have higher rigidity than the functional sheet 70. Here, the level of rigidity may be assessed, for example, by determining a plane that is orthogonal to the longitudinal direction of the support member 30 as a reference plane, and performing assessment based on the bending rigidity of the support member 30 at the reference plane and the bending rigidity, at the reference plane, of a partial region of the functional sheet 70 on which the support member 30 is provided. For example, the functional sheet 70 may be a laminate of an aluminum foil (radio-wave-shielding layer) and a non-woven fabric (heat-insulating and sound-insulating layer), and the support member 30 may be made from a relatively hard resin (for example, polypropylene (PP), polyamide (PA), or the like). By having a honeycomb structure or the like in addition to the recess-and-projection portion 33 formed by the above-described ribs 34, the weight of the support member 30 may be reduced while providing the support member 30 with strength. The support member 30 may be formed from a metal such as iron or aluminum. The support member 30 may be a composite member including resin and metal portions.

The support member 30 may be disposed at any area in the roof inner space; that is, the support member 30 may be disposed on any area of the functional sheet 70. For example, the support member 30 may be provided in accordance with the area where the device 50 is disposed. For example, in a case in which the device 50 is an antenna unit for external communication, the device 50 is disposed at a position corresponding to an antenna hole formed in the roof panel 12. Accordingly, it is sufficient that the support member 30 is disposed below the antenna hole formed in the roof panel 12. Alternatively, the support member 30 may be provided at a position corresponding to the frame 13 in the roof portion 14.

The support member 30 is fixed to the functional sheet 70 by means of an adhesive, a pressure-sensitive adhesive, a double-sided tape, welding (ultrasonic welding, heat welding, or the like), or the like. The support member 30 may be fixed to the functional sheet 70 by screwing, pinning, or the like. Here, the support member 30 is formed in the shape of an elongated rectangular cylinder. The length of the support member 30 is set so as to be the same as the width of the functional sheet 70. The length of the support member 30 may be smaller than the width of the functional sheet 70 to such a degree that the edges of the functional sheet 70 do not droop directly downward (for example, smaller by 20 cm or less). The support member 30 is disposed on the roof panel 12—side surface of the functional sheet 70. The surfaces of the support member 30 and the functional sheet 70 facing one another are bonded using an adhesive or the like.

The longitudinal direction of the support member 30 extends along the width direction of the functional sheet 70. Thus, the portion of the functional sheet 70 on which the support member 30 is provided is maintained in a state such that the portion does not readily droop downward in the width direction. The support member 30 may be disposed on any area of the functional sheet 70. The support member 30 may be provided on a partial area of the functional sheet 70.

The support member 30 may include roof fixing portions 40 that are fixed to the roof portion 14. The roof fixing portions 40 may be fixed to the roof panel 12 in the roof portion 14 or to the frame 13 supporting the roof panel 12. Accordingly, the device 50, the functional sheet 70, and the transmission member 80 can be hung down from and supported by the roof panel 12 or the frame 13, which supports the roof panel 12, via the support member 30. Thus, a situation in which the entire load of the device module 20 is exerted on the interior member 16 can be prevented.

The roof fixing portions 40 and the roof portion 14 may be fixed to one another in any way. For example, the roof fixing portions 40 and the roof portion 14 may be fixed to one another by screwing, pinning, or the like. Alternatively, for example, the roof fixing portions 40 and the roof portion 14 may be fixed to one another by means of an adhesive, a pressure-sensitive adhesive, a double-sided tape, welding (ultrasonic welding, heat welding, or the like), or the like.

In the roof inner space, there may be one or more devices provided at locations other than the support member 30, in addition to the device 50 provided on the support member 30. The devices may be provided on the roof panel 12, the frame 13, or the interior member 16 in the roof portion 14, or may be provided on the functional sheet 70. Transmission members 80 for the devices provided at locations other than the support member 30 may be provided to the roof panel 12, the frame 13, or the interior member 16 in the roof portion 14, or may be provided to the functional sheet 70.

The functional sheet 70 is installed in the roof portion 14 so as to extend planarly relative to the roof panel 12 and the interior member 16. For example, the functional sheet 70 may be disposed so as to extend over an area that is 80% or more of the roof portion 14. Alternatively, for example, the functional sheet 70 may be disposed so as to extend over the entire area above the headrests of the plurality of occupant seats in the vehicle cabin. As a result of the functional sheet 70 being disposed so as to extend in the roof portion 14, the function(s) of the functional sheet 70 can be exhibited over as wide an area as possible in the roof portion 14. Furthermore, the transmission member 80 and the device 50 disposed in the roof inner space can be supported over as wide an area as possible in the roof portion 14.

Effects, Etc.

According to the device module 20 configured as described above, the device 50 supported by the support surface 32 of the support member 30 is cooled as a result of cooling air flowing to the support-member-side flow path 36 from the duct-side flow path 18A. Accordingly, the device 50 can be cooled without being housed inside the duct 17. For example, there are cases in which electronic components having low heat resistance are used as electronic components in the device 50. The roof inner space tends to become hotter than spaces in a vehicle such as the vehicle cabin. As a result of the device 50 being cooled, electronic components having low heat resistance operate more stably even in the roof inner space, which tends to become hot.

Furthermore, the support member 30 has formed therein the through-hole 38, which is open in a portion of the support surface 32 facing the device 50 and which reaches the support-member-side flow path 36. Accordingly, the device 50 can be exposed to the support-member-side flow path 36 through the through-hole 38.

Furthermore, the device 50 is provided with the heat-transfer member 55 and the heat sink 56, which are heat-dissipating portions that face the through-hole 38. Accordingly, heat dissipation from the device 50 increases as a result of the heat-transfer member 55 and the heat sink 56, which are heat-dissipating portions, being cooled by cooling air.

Furthermore, the heat sink 56, which is a heat-dissipating portion, extends to the support-member-side flow path 36. Accordingly, the area of the heat-dissipating portion that is directly cooled by cooling air increases.

Furthermore, the support-member-side flow path 36 has formed herein the air discharge port 39, which is open separately from the air inlet port 37 and the through-hole 38 and which discharges cooling air to the roof inner space. Accordingly, cooling air flowing in the support-member-side flow path 36 can be discharged to the roof inner space from the air discharge port 39, which is different from the through-hole 38. Thus, cooling air does not readily stay inside the support-member-side flow path 36 even in a case in which cooling air cannot be readily discharged from the through-hole 38.

Furthermore, the device module 20 includes the tubular member 60, which is disposed between the support member 30 and the duct 17. Accordingly, the support member 30 and the duct 17 can be connected via the tubular member 60.

Furthermore, as a result of the tubular member 60 being formed from a material having high elasticity, the tubular member 60 can be inserted into the support-member-side flow path 36 with ease. Furthermore, the tubular member 60 and the support member 30 cannot be readily pulled out from one another because the flange portion 64 catches on the inner surface of the rim portion of an opening of the support-member-side flow path 36 in the support member 30 in a state in which the main body portion is inserted into the support-member-side flow path 36 from the opening.

Furthermore, the duct 17 is a rear-seat duct 17 in which air outlet ports 19A directed toward the rear seats are provided and which is disposed in the roof inner space, and the tubular member 60 connects the support member 30 and the rear-seat duct 17. Accordingly, the support member 30 and the rear-seat duct 17 can be connected via the tubular member 60.

Furthermore, the device module 20 further includes the functional sheet 70, on which the support member 30 is disposed, an outer surface of the support member 30 that is different from the support surface 32 is in contact with the functional sheet 70, and the functional sheet 70 includes a heat-insulating layer. Accordingly, heat is not readily transferred from the functional sheet 70 to the support member 30.

Furthermore, the device module 20 further includes the transmission member 80, which is connected to the device 50, and the transmission member 80 is fixed to the functional sheet 70. Accordingly, the transmission member 80 can be integrated with the device module 20.

Embodiment 2

Figure 8:
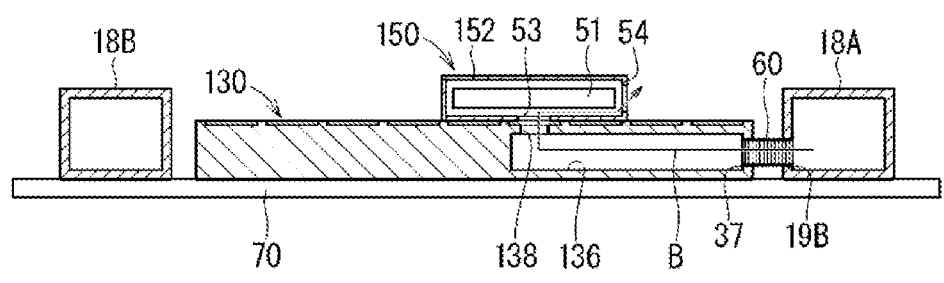
FIG. 8 is a cross-sectional view illustrating a device module according to embodiment 2.
Figure 8:
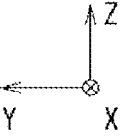
Figure 9:
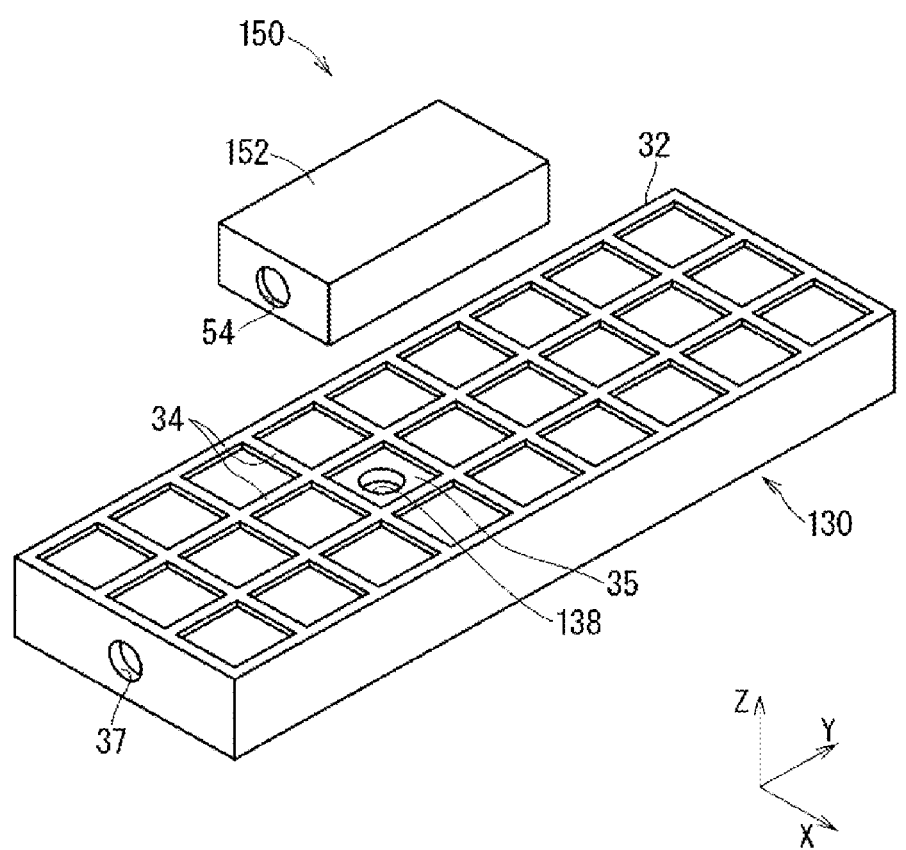
FIG. 9 is a perspective view illustrating a device and a support member.

A device module according to embodiment 2 will be described. FIG. 8 is a cross-sectional view illustrating a device module 120 according to embodiment 2. FIG. 9 is a perspective view illustrating a device 150 and a support member 130. Note that, in the description of the present embodiment, the same reference symbols will be given to constituent elements that are the same as those that have been described above, and description thereof will be omitted. This similarly applies to the description of the following embodiments and modifications.

In the device module 120 according to the present example, the flow of cooling air indicated by arrow B in FIG. 8 differs from the flow of cooling air in the above-described device module 20. A housing-side air inlet port 53 is formed in a housing 152 of the device 150. The housing-side air inlet port 53 is formed in a surface of the housing 152 that faces a through-hole 138 in the support member 130. Cooling air flowing in a support-member-side flow path 136 is discharged to the roof inner space via the through-hole 138, the housing-side air inlet port 53, and the interior of the housing 152. Accordingly, the interior of the housing 152 can be directly cooled by cooling air.

In the example illustrated in FIG. 8, a first through-hole 53 and a second through-hole 54 are formed in the housing 152. The first through-hole 53 is formed in the surface of the housing 152 facing the through-hole 138. The second through-hole 54 is formed in a surface of the housing 152 that is different from the surface in which the first through-hole 53 is formed. Inside the housing 152, the space in which the opening of the first through-hole 53 is present and the space in which the opening of the second through-hole 54 is present are in communication with one another. The first through-hole 53 functions as the housing-side air inlet port 53. The second through-hole 54 functions as a housing-side air discharge port 54. Note that, in the housing 152, the second through-hole 54 need not be formed as the housing-side air discharge port 54. For example, in a case in which the housing 152 is formed from only a container without a lid, the opening in the container functions as a housing-side air discharge port. Alternatively, for example, in a case in which there is a gap in the housing 152 connecting the exterior and internal spaces, the gap may function as a housing-side air discharge port. For example, the gap may be a gap between a container and a lid, a gap for exposing a connector to be connected to the transmission member 80, or the like.

In the present example, the through-hole 138 is smaller than the recesses 35 on the support surface 32, and is formed in a part of a recess 35. The four sides of the recess 35 having the through-hole 138 formed therein are surrounded by projections 34 (ribs 34). The projections 34 (ribs 34) are in contact with the housing 152. Accordingly, cooling air passing through the through-hole 138 is prevented from being discharged to the roof inner space via a gap between the support surface 32 and the housing 152, and can readily reach the interior of the housing 152 via the housing-side air inlet port 53.

The above-described air discharge port 39 is omitted in the support member 130. The support-member-side flow path 136 does not have any openings other than the air inlet port 37 and the through-hole 138. In other words, the support-member-side flow path 136 is closed except for the air inlet port 37 and the through-hole 138. Accordingly, cooling air flowing in the support-member-side flow path 136 is basically discharged to the roof inner space via the through-hole 138. Thus, in the present example, the through-hole 138 functions as an air discharge port. The support-member-side flow path 136 is shorter in the Y direction than the above-described support-member-side flow path 36. The support-member-side flow path 136 is closed at a position that is slightly past the through-hole 138 along the Y direction.

Furthermore, in the present example, the heat-transfer member 55 and the heat sink 56, which are heat-dissipating portions, are not provided. One or both of the heat-transfer member 55 and the heat sink 56 may be provided in the present example as well.

Embodiment 3

Figure 10:
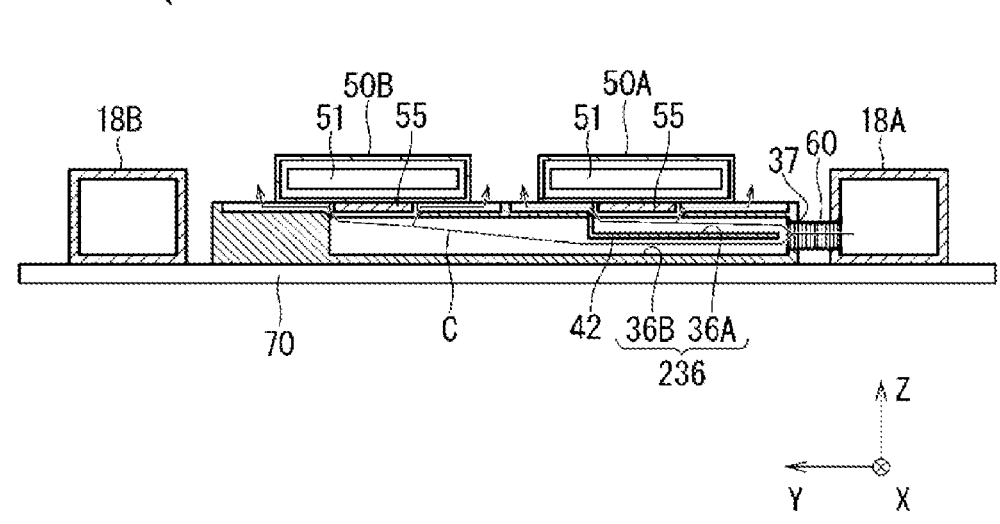
FIG. 10 is a cross-sectional view illustrating a device module according to embodiment 3.
Figure 11:
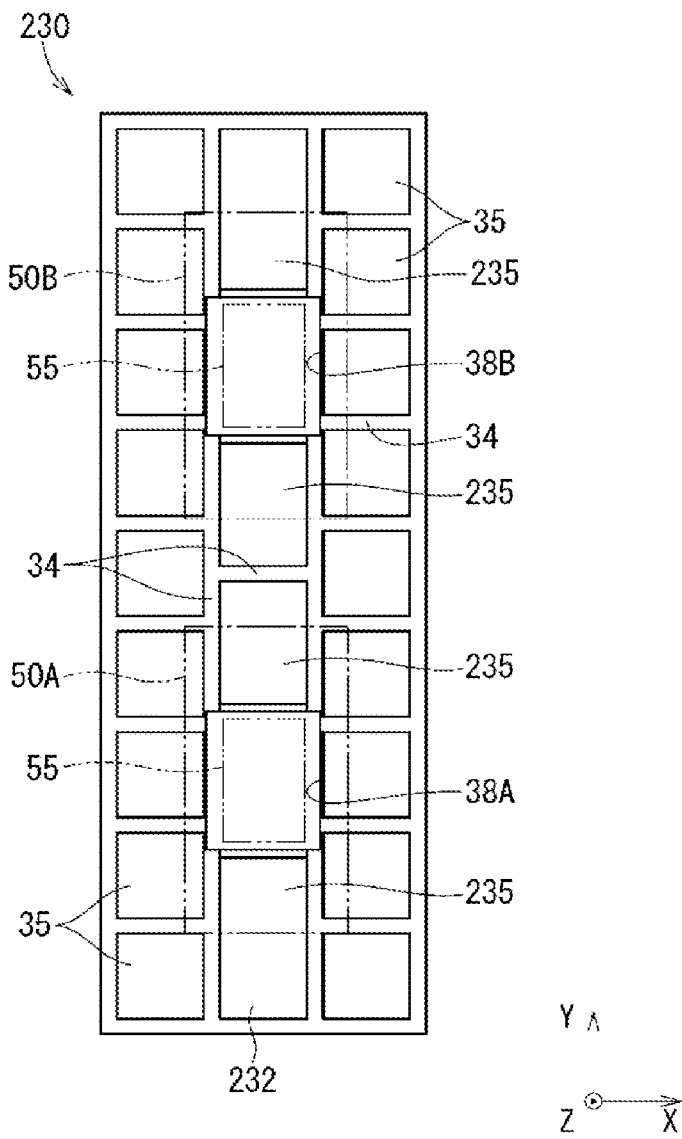
FIG. 11 is a plan view illustrating devices and a support member.

A device module according to embodiment 3 will be described. FIG. 10 is a cross-sectional view illustrating a device module 220 according to embodiment 3. FIG. 11 is a plan view illustrating the device 50 and a support member 230.

In the device module 220 according to the present example, the flow of cooling air indicated by arrow C in FIG. 10 differs from the flow of cooling air in the above-described device module 20. In the present example, a gap is provided between the device 50 and a portion of a support surface 232 around the through-hole 38. Cooling air flowing in a support-member-side flow path 236 is discharged to the roof inner space via the through-hole 38 and the above-described gap. Accordingly, the device 50 can be directly cooled by cooling air.

Here, due to a change in the arrangement of the ribs 34 around the through-hole 38 on the support surface 232, each recess 235 that is adjacent to the through-hole 38 in the Y direction is larger than the other recesses 35 when seen from the Z direction. The recess 235 is adjacent to the through-hole 38 without any rib 34 therebetween. The edge portion of the recess 235 along the Y direction is located further outward than the device 50 is. Due to such configurations, a gap via which cooling air is discharged from the through-hole 38 to the roof inner space is formed between the outer surface of the recess 235 and the outer surface of the device 50.

In the present example, the heat-transfer member 55 is provided as a heat-dissipating portion. The heat-transfer member 55 reduces the gap between the device 50 and the portion of the support surface 232 around the through-hole 38.

Furthermore, in the present example, the device 50 includes a first device 50A and a second device 50B. The first device 50A and the second device 50B are provided on one support member 230 so as to be separated from one another in the Y direction. A through-hole 38A for the first device 50A and a through-hole 38B for the second device 50B are provided in the support surface 232.

A partition 42 is provided inside the support member 230. The partition 42 partitions the support-member-side flow path 36 into a first flow path 36A for the first device 50A and a second flow path 36B for the second device 50B. Accordingly, cooling air can flow through different flow paths to the first device 50A and the second device 50B. Thus, a situation can be prevented in which the amount of cooling air flowing to one device 50 is excessively smaller than the amount of cooling air flowing to the other device 50, or cooling air heated due to heat exchange with one device 50 flows to the other device 50.

The partition 42 is connected to inner surfaces of the support-member-side flow path 236 at both sides along the X direction. A first end portion of the partition 42 along the Y direction is positioned between the air inlet port 37 and the through-hole 38A for the first device 50A. The first end portion of the partition 42 along the Y direction is not connected to the inner surfaces of the support-member-side flow path 236 along the Y direction. A second end portion of the partition 42 along the Y direction is positioned between the through-hole 38A for the first device 50A and the through-hole 38B for the second device 50B. The second end portion of the partition 42 along the Y direction is bent toward the Z direction. The second end portion of the partition 42 is connected to a support surface 232 side inner surface along the Z direction. The first flow path 36A is closed except for an opening in the first end portion side and the through-hole 38A. The second flow path 36B is closed except for an opening in the first end portion side and the through-hole 38B.

The air discharge port 39 is omitted in the support member 230 in the present example as well. The support-member-side flow path 236 is closed except for the air inlet port 37 and the through-holes 38. The support-member-side flow path 236 does not have any openings other than the air inlet port 37 and the through-holes 38. The through-holes 38 also serve as air discharge ports. Accordingly, cooling air flowing in the support-member-side flow path 236 is basically discharged to the roof inner space via the through-holes 38. The support-member-side flow path 236 is shorter in the Y direction than the above-described support-member-side flow path 36. The support-member-side flow path 236 is closed at a position that is slightly past the through-hole 38B along the Y direction.

Embodiment 4

Figure 12:
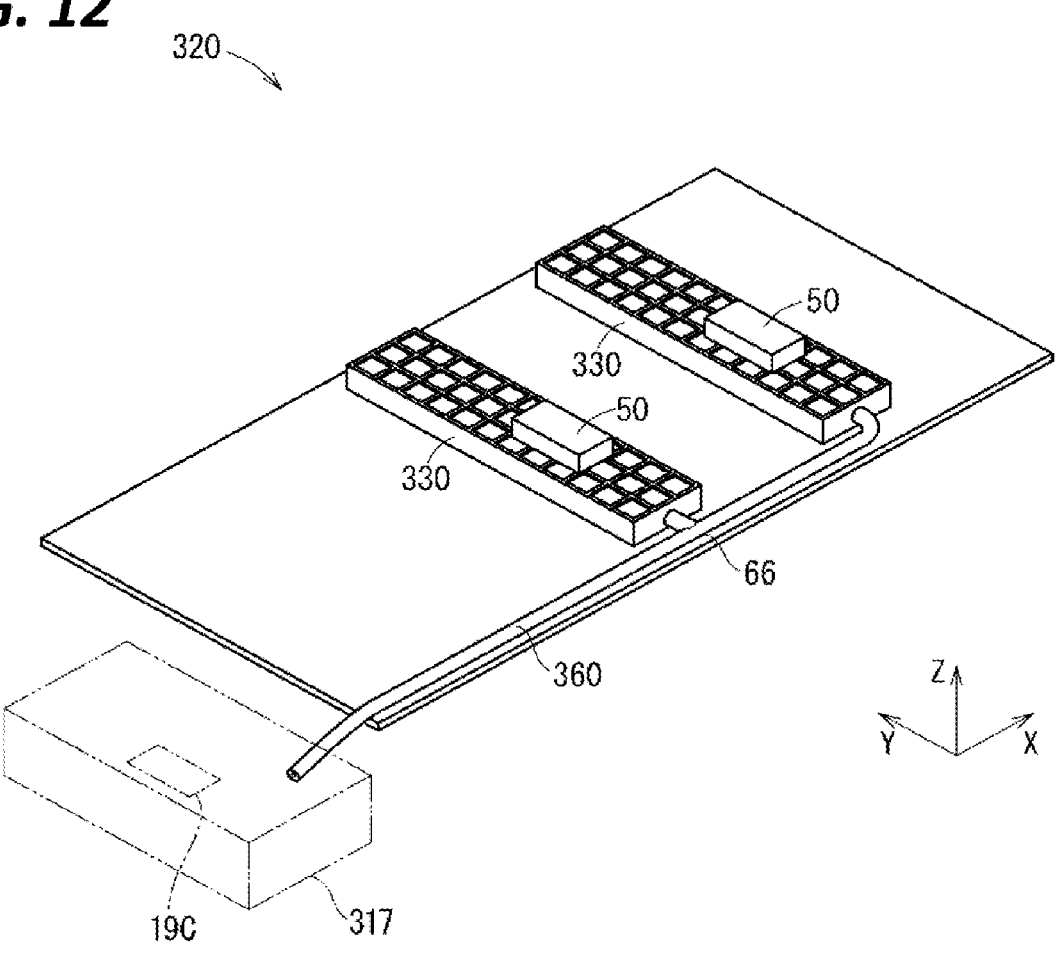
FIG. 12 is a perspective view illustrating a device module according to embodiment 4.
Figure 13:
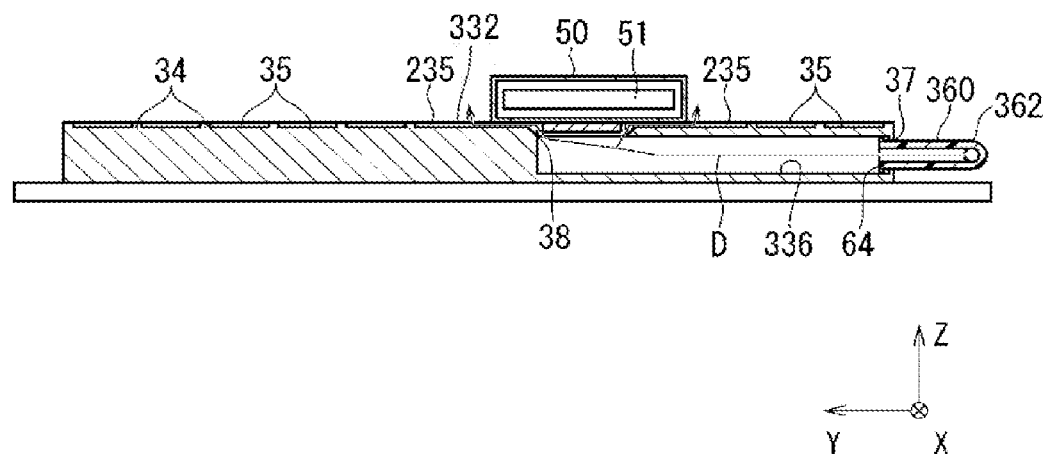
FIG. 13 is a cross-sectional view illustrating the device module according to embodiment 4.

A device module according to embodiment 4 will be described. FIG. 12 is a perspective view illustrating a device module 320 according to embodiment 4. FIG. 13 is a cross-sectional view illustrating the device module 320 according to embodiment 4.

In the device module 320 according to the present example, a duct 317 is not a rear-seat duct 17, and is a front-seat duct 317. The duct 317 is provided with an air outlet port 19C directed toward the front seats. A tubular member 360 connects a support member 330 and the front-seat duct 317. Accordingly, the support member 330 and the front-seat duct 317 can be connected via the tubular member 360.

The front-seat duct 317 may be disposed in the roof inner space, similarly to the above-described rear-seat duct 17. The front-seat duct 317 need not be disposed in the roof inner space. For example, the front-seat duct 317 may be disposed in a space behind the instrument panel, or the like.

The tubular member 360 is formed so as to be longer than the above-described tubular member 60. The duct 317 is disposed in the roof inner space so as to be separated from the support member 330 in the X direction. Alternatively, the duct 317 is not disposed in the roof inner space and disposed below the roof inner space. Thus, the tubular member 360 extends in the X direction from the portions where the tubular member 360 is connected to the support member 330. In a case in which the duct 317 is not disposed in the roof inner space and disposed below the roof inner space, the tubular member 360 may extend downward along an A-pillar from the roof inner space to be connected to the duct 317.

Note that, similarly to the tubular member 60, the tubular member 360 is provided with the flange portion 64, and is prevented from being pulled out from a support-member-side flow path 336 by the flange portion 64. Furthermore, while a tubular main body portion 362 of the tubular member 360 has the shape of a straight tube, the tubular main body portion 362 may have the shape of a corrugated tube, similarly to the above-described tubular main body portion 62.

Similarly to the support member 230 in embodiment 3, a gap is provided between the device 50 and the portion of a support surface 332 around the through-hole 38 in the support member 330 in the present example as well. The gap is formed between the device 50 and each recess 235 that has become larger than the other recesses 35 as a result of the arrangement of some ribs 34 being changed. Furthermore, the air discharge port 39 is omitted in the support member 330. The support-member-side flow path 336 is closed except for the air inlet port 37 and the through-hole 38. Note that the support member 330 in the present example is different from the support member 230 in embodiment 3 in that the support member 330 supports one device 50. Accordingly, cooling air flowing in the support-member-side flow path 336 is discharged to the roof inner space via the through-hole 38 and the above-described gap as indicated by arrow D in FIG. 13. Accordingly, the device 50 can be directly cooled by cooling air.

In the present example, a plurality of support members 330 are provided. A device 50 is supported by each of the plurality of support members 330. The plurality of support members 330 are provided so as to be separated from one another in the X direction. One tubular member 360 branches along the way from the duct 317 side to the plurality of support members 330, and is connected to each of the plurality of support members 330. Thus, the tubular member 360 is provided with a branching portion 66. Accordingly, the plurality of support members 330 and the duct 317 can be connected via one tubular member 360. However, the plurality of support members 330 may each be connected to the duct 317 via a different tubular member.

Modifications

Up to this point, description has been provided on the assumption that the through-hole 38 is formed in the support member 30. However, this configuration is not essential. The through-hole 38 need not be formed in the support member 30. In this case, heat exchange may be carried out between the device 50 and cooling air via a first wall portion between the support surface 32 and an inner surface of the support-member-side flow path 36. Here, the first wall portion may be formed from a material having a higher heat transfer property than the material of a second wall portion, the second wall portion being a wall portion between a second surface constituting the support-member-side flow path 36 and an outer surface that is different from the support surface 32. For example, the second wall portion is the wall portion between the support-member-side flow path 36 and the functional sheet 70.

Furthermore, while description has been provided up to this point on the assumption that the device module (20, 120, 220, 320) includes the tubular member (60, 360), this configuration is not essential. The device module (20, 120, 220, 320) need not include the tubular member (60, 360). In this case, for example, the duct (17, 317) and the support member (30, 130, 230, 330) may be directly connected.

Furthermore, while description has been provided up to this point on the assumption that the device module (20, 120, 220, 320) includes the functional sheet 70, this configuration is not essential. The device module (20, 120, 220, 320) need not include the functional sheet 70. In this case, for example, the support member (30, 130, 230, 330) may be provided on the interior member 16.

Furthermore, while description has been provided up to this point on the assumption that the transmission member 80 connected to the device (50, 150) is provided to the functional sheet 70, this configuration is not essential. The transmission member 80 connected to the device (50, 150) need not be provided to the functional sheet 70. In this case, for example, the transmission member 80 connected to the device (50, 150) may be provided to the interior member 16.

Furthermore, while description has been provided up to this point on the assumption that the device (50, 150) provided on the support member (30, 130, 230, 330) is positioned on the roof panel 12—side of the functional sheet 70, this configuration is not essential. For example, the device provided on the support member (30, 130, 230, 330)

may be positioned on the interior member 16—side of the functional sheet 70. Furthermore, for example, as devices provided on the support member (30, 130, 230, 330), both a device positioned on the roof panel 12—side of the functional sheet 70 and a device positioned on the interior member 16—side of the functional sheet 70 may be present. In this case, it is preferable that the transmission member 80 is mainly disposed on the interior member 16—side surface of the functional sheet 70, and passes through the functional sheet 70 for connection with the device disposed on the roof panel 12—side.

Note that the configurations described in the embodiments and modifications can be combined with one another, as appropriate, as long as they are not contradictory. For example, similarly to the example described in embodiment 4, a plurality of support members (30, 130, 230) may be provided in the examples described in embodiments 1 to 3 as well.

LIST OF REFERENCE NUMERALS

10 Vehicle
11 Body
12 Roof panel
13 Frame
14 Roof portion
16 Interior member
17, 317 Duct
18A, 18B, 18C Duct-side flow path
19A, 19B, 19C Air outlet port
20, 120, 220, 320 Device module
30, 130, 230, 330 Support member
31 Support main body portion
32, 232, 332 Support surface
33 Recess-and-projection portion
34 Projection (Rib)
35, 235 Recess
36, 136, 236, 336 Support-member-side flow path
37 Air inlet port
38, 138 Through-hole
39 Air discharge port
40 Roof fixing portion
42 Partition
50, 150 Device
51 Device main body
52, 152 Housing
53 First through-hole (housing-side air inlet port)
54 Second through-hole (housing-side air discharge port)
55 Heat-transfer member (heat-dissipating portion)
56 Heat sink (heat-dissipating portion)
57 Base
58 Fin
60, 360 Tubular member
62, 362 Tubular main body portion
64 Flange portion
66 Branching portion
70 Functional sheet
80 Transmission member

What is claimed is:

1. A device module comprising:
a support member that is disposed in a roof inner space that is located between a roof panel and an interior member in a vehicle; and
a device that is supported by a first support surface among outer surfaces of the support member,
wherein a support-member-side flow path is formed inside the support member, wherein the support-member-side flow path is confined within an internal space of the support member and is isolated from the first support surface, and
the support-member-side flow path is connected to a duct-side flow path in a duct in the vehicle.

2. The device module according to claim 1, wherein the support member has formed therein a through-hole that is open in a portion of the first support surface facing the device and that reaches the support-member-side flow path.

3. The device module according to claim 2, wherein the device is provided with a heat-dissipating portion that faces the through-hole.

4. The device module according to claim 3, wherein the heat-dissipating portion projects to the support-member-side flow path.

5. A device module comprising:
a support member that is disposed in a roof inner space that is located between a roof panel and an interior member in a vehicle; and
a device that is supported by a support surface among outer surfaces of the support member,
wherein a support-member-side flow path is formed inside the support member, and
the support-member-side flow path is connected to a duct-side flow path in a duct in the vehicle,
wherein the support member has formed therein a through-hole that is open in a portion of the support surface facing the device and that reaches the support-member-side flow path,
wherein a housing of the device has a housing-side air inlet port formed therein, the housing-side air inlet port being formed in a surface of the housing that faces the through-hole, and
cooling air flowing in the support-member-side flow path is discharged to the roof inner space via the through-hole, the housing-side air inlet port, and the interior of the housing.

6. The device module according to claim 2,
wherein a gap is provided between the device and a portion of the first support surface around the through-hole, and
cooling air flowing in the support-member-side flow path is discharged to the roof inner space via the through-hole and the gap.

7. The device module according to claim 5,
wherein the support-member-side flow path is closed except for the through-hole and an air inlet port that is connected to the duct.

8. The device module according to claim 2, wherein the support-member-side flow path has formed therein an air discharge port that is open separately from the through-hole and an air inlet port connected to the duct, and that discharges cooling air to the roof inner space.

9. A device module comprising:
a support member that is disposed in a roof inner space that is located between a roof panel and an interior member in a vehicle; and
a device that is supported by a support surface among outer surfaces of the support member,
wherein a support-member-side flow path is formed inside the support member, and
the support-member-side flow path is connected to a duct-side flow path in a duct in the vehicle,
wherein there are a plurality of the devices including a first device and a second device, and
a partition that partitions the support-member-side flow path into a first flow path for the first device and a second flow path for the second device is provided inside the support member.

10. The device module according to claim 1, further comprising:

a tubular member that is disposed between the support member and the duct.

11. The device module according to claim 10, wherein the tubular member includes a main body portion and a flange portion that projects from the outer surface of the main body portion, and in a state in which the main body portion is inserted into the support-member-side flow path from an opening of the support-member-side flow path in the support member, the flange portion catches on the inner surface of a rim portion of the opening.

12. The device module according to claim 10, wherein the duct is a rear-seat duct that is provided with an air outlet port directed toward a rear seat and that is disposed in the roof inner space, and the tubular member connects the support member and the rear-seat duct.

13. The device module according to claim 10, wherein the duct is a front-seat duct that is provided with an air outlet port directed toward a front seat, and the tubular member connects the support member and the front-seat duct.

14. The device module according to claim 1, further comprising:

a functional sheet which includes a layer at least having a heat-insulating function and on which the support member is disposed, wherein an outer surface of the support member that is different from the support surface is in contact with the functional sheet.

15. The device module according to claim 14, further comprising:

a transmission member that is connected to the device, wherein the transmission member is provided to the functional sheet.

\* \* \* \* \*